United States Patent [19]

Higuchi et al.

[11] 3,891,709

[45] June 24, 1975

[54] POLYOXYALKYLENE AMINES

[75] Inventors: Masaru Higuchi; Kouichi Ohnaka, both of Ohimachi, Japan

[73] Assignee: Daicel, Ltd., Osaka, Japan

[22] Filed: June 13, 1973

[21] Appl. No.: 369,469

[30] Foreign Application Priority Data

June 27, 1972 Japan.................. 47-64316

[52] U.S. Cl....... 260/584 B; 260/584 C; 260/584 R; 106/144; 117/138.8
[51] Int. Cl.².......................................... C07C 93/10
[58] Field of Search......... 260/584 B, 584 R, 584 C

[56] References Cited
UNITED STATES PATENTS

| | | | |
|---|---|---|---|
| 3,317,505 | 5/1967 | Braus............................ | 260/584 R |
| 3,697,423 | 10/1972 | Sundby et al.................. | 260/584 B |

FOREIGN PATENTS OR APPLICATIONS

| | | | |
|---|---|---|---|
| 1,129,823 | 10/1968 | United Kingdom............ | 260/584 B |
| 1,155,875 | 6/1969 | United Kingdom............ | 260/584 B |

*Primary Examiner*—Lewis Gotts
*Assistant Examiner*—D. R. Phillips
*Attorney, Agent, or Firm*—Woodhams, Blanchard and Flynn

[57] ABSTRACT

An antistatic agent for plastics comprising a compound of the formula

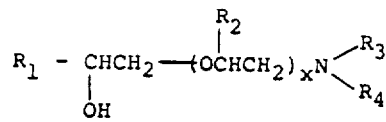

wherein $R_1$ is alkyl having 7 to 29 carbon atoms, $R_2$ is hydrogen or alkyl having 1 or 2 carbon atoms, $R_3$ is lower alkyl having 1 to 4 carbon atoms or a hydroxyalkyl group of the formula

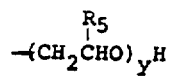

(in which $R_5$ is hydrogen or alkyl having 1 or 2 carbon atoms and y is an integer of from 1 to 3), $R_4$ is lower alkyl having 1 to 4 carbon atoms or a hydroxyalkyl group of the formula

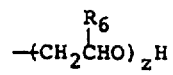

(in which $R_6$ is hydrogen or alkyl having 1 or 2 carbon atoms and z is an integer of from 1 to 3), and $x$ is an integer of from 1 to 3.

The agent can be mixed in molding compositions and it also can be applied as a coating on molded articles.

4 Claims, No Drawings

POLYOXYALKYLENE AMINES

BACKGROUND OF THE INVENTION

1. Field of the Invention

This invention relates to a novel antistatic agent for synthetic resins.

2. Description of the Prior Art

In general, plastics have a high electric insulation resistance and, therefore, static electricity is readily generated in plastics by friction and accumulates thereon. Because of this phenomenon, molded plastic articles attract dust and like fine particles contained in air, resulting in a poor surface appearance of the molded articles. Further, when such electrostatically charged plastic molded articles contact human bodies, unpleasant shocks are frequently imparted to the bodies.

Various troubles are caused by accumulation of electrostatic charges in plastics, both during the molding thereof and during handling of the molded articles. For instance, dust collects on the plastic during the compounding step and workers can receive shocks during the processing steps. Moreover, in the case of plastic films, as is well known, such films are caused to adhere to each other by electrostatic charges thereon.

Accordingly, it is important to prevent generation and/or accumulation of static electricity during the step of molding plastics and in the molded plastic articles. As means for preventing such static electrification, there have been proposed and studied various methods, including a method comprising coating the surface of a molded plastic article with a surface active agent having an antistatic property, a method comprising heating and melting an antistatic agent together with the plastic material during the molding step, a method comprising kneading the antistatic agent into the plastic material mechanically, and other similar methods.

However, in the conventional method which comprises coating an antistatic agent on the surface of the molded plastic article, the antistatic agent is exfoliated when the molded article is rubbed or subjected to a washing treatment or the like. Thus, it is very difficult to maintain the antistatic effect for a long time.

In the method comprising kneading an antistatic agent into the plastic material mechanically, even if the surface antistatic effect is once lost by rubbing, washing or the like, it is restored after a period of time because the antistatic agent kneaded in the plastic material bleeds to the surface of the molded article. Therefore, the antistatic effect can be attained again and it is possible to maintain the antistatic property in the molded plastic article for a long time. However, when a conventional antistatic agent known in the art is employed, it is difficult to maintain a satisfactory antistatic effect for a long time, unless a considerable amount of the agent is kneaded into the synthetic resin. If a great amount of the antistatic agent is incorporated in the resin, there is frequently observed degradation of the desired inherent properties of the resin such as thermal stability, strength, elongation, elastic modulus, surface friction coefficient, antiblocking characteristic, water-absorbing property, weatherability, transparency, surface hardness, luster and the like. Thus, an antistatic agent satisfactory in all of the foregoing points has not yet been developed.

SUMMARY OF THE INVENTION

We have discovered antistatic agents which, when coated on the surface of a molded plastic article, maintain the desired antistatic property of the articles even when they are washed or rubbed and which, when kneaded in a plastic material, do not affect adversely the other desired properties of the plastics. When the antistatic agent according to this invention is heated and melted and is kneaded mechanically into a plastic material, it is very stable even during high temperature processing and it does not cause coloration of the moldable composition due to decomposition. Further, because it has an appropriate compatibility with plastics, it does not damage the luster and transparency thereof. Further, not only does it exhibit a longer-lasting antistatic effect, but also it recovers readily the antistatic effect if it is once removed by rubbing or washing. Moreover, the antistatic agent of this invention can be used conveniently together with other conventional additives for moldable synthetic resin compositions such as plasticizers, stabilizers, dyes and pigments. The antistatic property of a molded article can be improved by applying the antistatic agent of this invention onto only the surface of the molded article by coating, spraying or the like.

The antistatic agent of this invention has the following formula:

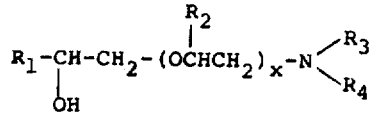

wherein $R_1$ is alkyl having 7 to 29 carbon atoms, $R_2$ is hydrogen or alkyl having 1 to 2 carbon atoms, $R_3$ is a lower alkyl having 1 to 4 carbon atoms or hydroxyalkyl of the formula

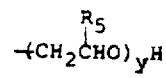

(in which $R_5$ is hydrogen or alkyl having 1 to 2 carbon atoms and $y$ is an integer of from 1 to 3), $R_4$ is lower alkyl having 1 to 4 carbon atoms or a hydroxyalkyl group of the formula

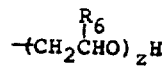

(in which $R_6$ is hydrogen or alkyl having 1 or 2 carbon atoms and $z$ is an integer of from 1 to 3), and $x$ is an integer of from 1 to 3.

As is conventional, the term "alkyl" refers to groups of the formula $C_nH_{2n+1}$.

It is preferred that $R_1$ in the above formula is a straight chain alkyl, for instance, n-octyl, n-decyl, n-dodecyl, n-tetradecyl, n-hexadecyl or n-octadecyl group. Mixtures of antistatic agents of the above formula can be used.

If the number of carbon atoms of $R_1$ is 6 or less, such a compound, when incorporated in plastics, is easily evaporated when heated and molten, resulting in a reduction of the antistatic effect. If $R_1$ has 30 or more carbon atoms, the antistatic effect is inferior. Accordingly, the number of carbon atoms of $R_1$ is from 7 to 29, preferably from 10 to 16. When the number of carbon atoms in any of $R_2$, $R_5$ and $R_6$ is 3 or more, a good antistatic effect cannot be obtained. When one or both of $R_3$ and $R_4$ is hydrogen, an antistatic effect can be attained, but the thermal stability of the antistatic agent is not fully satisfactory. Accordingly, it is preferred that $R_3$ and $R_4$ are alkyls of 1 or 2 carbon atoms or hydroxyalkyls expressed by the formula

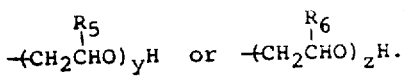

Japanese Patent Publication No. 10729/67 discloses as an antistatic agent a compound containing a hydroxyl group bonded to the β-position of a polar atomic group linked to the end of a long-chain alkyl group as is also the case in the case of the antistatic agent of this invention. More specifically, this publication discloses a reaction product formed from an olefin oxide and an alkanolamine according to the following reaction scheme:

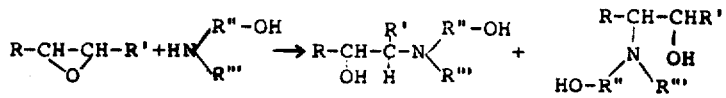

in which R is a saturated aliphatic hydrocarbon group having 8 to 22 carbon atoms, R' is hydrogen or a saturated aliphatic hydrocarbon group having 1 to 6 carbon atoms, R'' is a saturated aliphatic hydrocarbon radical having 2 to 6 carbon atoms, and R''' is hydrogen, an alkylol radical having 2 to 6 carbon atoms or a saturated aliphatic hydrocarbon group having 1 to 6 carbon atoms.

This product is disclosed as being effective to impart an antistatic property to polyolefins.

In the antistatic agent according to this invention, there is an intervening ether linkage, whereas the antistatic agent disclosed in said Patent Publication does not have such ether linkage. Thus, this known antistatic agent is quite different from the antistatic agent of this invention with respect to its fundamental structure.

Further, as is illustrated in the examples given hereinafter, because of the presence of such intervening ether linkage, the antistatic agent of this invention exhibits a much better antistatic effect than the antistatic agent disclosed in said Patent Publication.

Japanese Patent Publication No. 22901/69 teaches that a compound containing an ether linkage in the chain imparts an antistatic property to polyolefins. Specifically, it is taught that compounds of the following formula

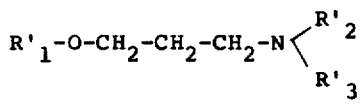

wherein $R_1'$ is an alkyl, alkenyl, alkylcycloalkyl, aryl, alkylaryl or alkenylaryl group containing 6 to 25 carbon atoms in the alkyl moiety, and $R_2'$ and $R_3'$ each is hydrogen, an alkyl group having 1 to 5 carbon atoms or a radical $(C_xH_{2x}O)_nH$ (in which $x$ is an integer of 2 or 3 and $n$ is an integer of 1 to 10), are effective for rendering polyolefins antistatic.

Although the antistatic agent of this invention is similar to that disclosed in said latter Patent Publication in the point that an intervening ether linkage is present, the antistatic agent of this invention is clearly distinguished from the antistatic agent disclosed in said latter Patent Publication in respect to the point that the antistatic agent of this invention contains a hydroxyl group at the β-position of the oxygen atoms bonded to the end of the long-chain alkyl group.

As is illustrated in the examples of said latter Patent Publication, the antistatic effect attained by the antistatic agent of said latter Patent Publication becomes reduced as time passes, for instance, during a period of 4 months or 1 year from the preparation of the molded article, whereas the antistatic agent of this invention, as is illustrated in the examples given hereinafter, provides a sufficient antistatic effect immediately after the molding and this antistatic effect improves as time passes. Further, the antistatic agent of this invention is very excellent in providing an initial, high level, antistatic effect.

This means that the amount of the antistatic agent, according to this invention, required to be incorporated in the molding composition can be reduced as compared with conventional antistatic agents and when the antistatic effect is once lost by rubbing or washing, it can be restored quickly. Thus, the antistatic agent of this invention is very advantageous. Furthermore, as is illustrated in the examples given hereinafter, when tobacco ash adhering tests were conducted under the same conditions as described in said Japanese Patent Publication, the antistatic agent of this invention exhibited a similar effect, when it was incorporated in the resin in an amount corresponding to one-fourth to one-half of the amount employed of the antistatic agent disclosed in said latter Patent Publication. This shows that the antistatic agent according to the present invention is very excellent. Thus, the antistatic agent of this invention is superior to the conventional antistatic agents with respect to the antistatic effect.

The antistatic agent of this invention can be prepared by reacting a long-chain alkylene oxide (such, for example, as epoxy compounds obtained by oxidizing an α-olefin formed by oligomerization of ethylene or decomposition of paraffin, with hydrogen peroxide, peracetic acid, t-butyl hydroperoxide or the like) and an alkanol amine of the formula

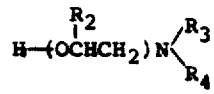

(such, for example, as triethanol amine and triisopropanol amine) by a conventional method, for example, a method comprising reacting both the reactants at a high temperature in a nitrogen atmosphere or reacting them in an inert solvent in the presence of a catalyst such as an acid or alkali, distilling the reaction product or washing it with heated distilled water, and drying it to obtain a purified product.

It is desired that the presence of impurities in the reaction product is minimized. However, even when minute amounts of the unreacted long-chain alkylene oxide and the by-products formed by side reactions are present in the antistatic agent of this invention, the intended antistatic effect is not damaged.

The antistatic agent of this invention has an appropriate compatibility with plastics of the polyvinyl chloride, polyolefin such as polyethylene and polypropylene, polystyrene and cellulose types such as cellulose acetate and cellulose acetate butyrate and other plastics, and it is stable at high temperatures. Accordingly, when it is heated so as to be molten and is kneaded in a plastic material, it does not decompose and it does not cause coloration of the molding composition. The inherent properties of the synthetic resin, such as the luster, are not damaged at all by incorporating therein the antistatic agent of this invention.

The amount of the antistatic agent to be incorporated in plastic molding compositions varies depending on the particular kind of the plastic material employed, but it is generally incorporated in the amount of 0.1 to 5.0%, preferably 0.3 to 3.0% by weight, based on the weight of the plastic material.

It is possible to mix the antistatic agent of this invention into powder or beads of the plastic by means of a suitable mixing apparatus such as a pan mill and a vibration mixer. Preferably, the antistatic agent of this invention is uniformly blended into the plastic material by a method comprising dissolving, dispersing or emulsifying the antistatic agent in a suitable organic solvent (such as chloroform and ether), immersing powder (or beads) of the plastic in the resulting liquid mixture, agitating the blend vigorously and removing the organic solvent by distillation in vacuo.

The plastic powder or beads, thus incorporated uniformly with the antistatic agent, is molded into the desired molded article by conventional methods. For example, it can be kneaded on a heating roll and then molded into a sheet, or it can be molded into a sheet, film, filament or granular product by means of an extruder. Further, it can be molded into a sheet article by a rolling method or a molded article can be prepared from it by an injection molding method. The thus-formed molded article comprising an antistatic agent of this invention have much higher antistatic characteristics than molded articles prepared without incorporation of the antistatic agent of this invention.

Furthermore, an improved antistatic effect can be obtained in a previously molded plastic article by a method comprising dissolving the antistatic agent of this invention in an inorganic solvent such as ether, chloroform, alcohol or benzene, and applying the solution on the surface of the molded article by spraying or the like. In this case, if the amount of the antistatic agent applied on the surface of the molded article is too small, a sufficient antistatic effect cannot be obtained, and if the amount of the antistatic agent applied is too great, the following disadvantages are readily brought about. Namely, the transparency of the molded article is damaged, and the surface of the molded article becomes sticky, which results in blocking of molded articles or insufficient or bad printing finish or in stickiness of dust onto the surface of the molded article. Accordingly, it is necessary to determine the amount of the antistatic agent to be applied in view of the intended antistatic effect and to avoid occurrence of these defects. In the case of the antistatic agent of this invention, when it is applied in an amount of 0.01 to 0.1 mg/cm$^2$, based on the surface area of the molded article treated, it is possible to obtain a sufficient antistatic effect while reducing the occurrence of such disadvantages to the lowest possible level. According to this application method, the antistatic agent of this invention can be used not only for treating the surfaces of molded articles made of thermoplastic plastics but also for treating the surfaces of molded articles made of other plastics such as thermosetting plastics, e.g., epoxy resin, phenol resins, urea resins, etc. In this case, it is necessary to select a solvent which does not adversely affect the plastic material to which the antistatic agent is applied. It is desired to apply the antistatic agent at a uniform rate to the surface of the molded plastic article.

The excellent effects attained by the antistatic agent of this invention will now be further described by reference to Synthesis Procedures and Examples, but the scope of the invention is not limited by these examples which are given for purposes of illustration only.

Synthesis Procedure 1

(Synthesis of Antistatic Agent of This Invention)

1. In a nitrogen gas current, 156 parts of 1,2-decene oxide, 224 parts of triethanol amine, 2 parts of sodium hydroxide and 200 parts of isopropyl alcohol were reacted at 90°–95°C for 6 hours. After completion of the reaction, isopropyl alcohol was removed by vacuum distillation, and excess triethanol amine and sodium hydroxide were removed by washing twice, each time with 500 parts of distilled water heated to 98°C. The reaction product was recovered by effecting distillation under 10–20 mm Hg, and dried to obtain a faintly yellow product.

When the reaction product was subjected to infrared analysis, it was found that the absorption at 831 cm$^{-1}$ inherent to the epoxy group disappeared. Thus, it was confirmed that the reaction was complete. In addition, an absorption inherent to the ether group was observed at 1120 cm$^{-1}$.

As a result of NMR analysis, peaks were observed at $\tau$=5.2, 6.4, 7.5, 8.7, and 9.1 and the integration ratio was 3 : 9 : 6 : 16 : 4.

When heavy water was added, the peak at $\tau$=5.2 disappeared, and hence, it was confirmed that this peak was inherent to the hydroxyl group. The peaks at $\tau$=8.7 and 9.1 were inherent to the methylene and methyl groups in the long-chain alkyl group, respectively.

The peak at $\tau$=6.4 was one inherent to the hydrogen atom bonded to the carbon atom adjacent to the oxygen atom, and the peak at $\tau$=7.5 was one inherent to the hydrogen atom bonded to the carbon atom adjacent to the nitrogen atom.

The following antistatic agent according to this invention

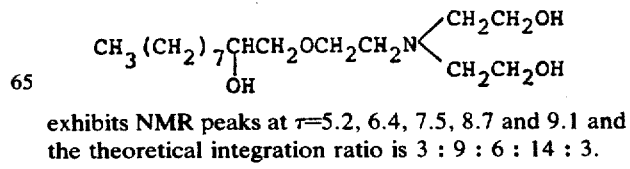

exhibits NMR peaks at $\tau$=5.2, 6.4, 7.5, 8.7 and 9.1 and the theoretical integration ratio is 3 : 9 : 6 : 14 : 3.

The reason why the integration ratio of the peaks at $\tau=8.7$ and 9.1 of the obtained reaction product differs slightly from the theoretical value is that a minute amount of the long chain alkene was contained in the reaction product. However, the positions of the peaks at $\tau=5.2$, 6.4 and 7.5 and the integration ratio of these values were quite in accord with theoretical ones. Thus, it is apparent that the thus-obtained reaction product was the intended antistatic agent according to this invention.

2. In the same manner as described above, 1,2-alkylene oxides having 12 carbon atoms, 12 and 14 carbon atoms, 16 and 18 carbon atoms and 20 – 28 carbon atoms, respectively, were reacted with triethanol amine, and 1,2-alkylene oxide having 12 and 14 carbon atoms was reacted with tri-isopropanol amine in the same manner as described above. As a result of the infrared analyses and NMR analyses of the resulting reaction products, it was confirmed that they were antistatic agents according to this invention.

3. Under nitrogen current, 210 parts of 1,2-alkylene oxide having 12 and 14 carbon atoms and 224 parts of triethanol amine were reacted at 120°C for 6 hours, and the purification was carried out in the same manner to obtain a faintly yellow reaction product.

As a result of the infrared analysis and NMR analysis of the reaction product, it was confirmed that it was an antistatic agent according to this invention.

The thus-obtained antistatic agents mentioned in (1), (2) and (3) above are shown in Table 1. These antistatic agents were evaluated as regards the antistatic effect on plastics in the examples given hereinbelow.

Table 1

| Abbreviation of Antistatic Agent | Number of Carbon Atoms of 1,2-Alkylene oxide ($R_1 + 2$) | Antistatic Agents of this Invention | | Remarks |
|---|---|---|---|---|
| | | Kind of Alkanol Amine | Structural Formula | |
| A | 10 | Triethanol amine | $CH_3(CH_2)_7CHCH_2OCH_2CH_2N\langle{}^{CH_2CH_2OH}_{CH_2CH_2OH}$ <br> $\mid$ <br> OH | reacted in solvent |
| B | 12 | " | $CH_3(CH_2)_9CHCH_2OCH_2CH_2N\langle{}^{CH_2CH_2OH}_{CH_2CH_2OH}$ <br> $\mid$ <br> OH | " |
| C – 1 | 12 + 14 | " | $CH_3(CH_2)_{9-11}CHCH_2OCH_2CH_2N\langle{}^{CH_2CH_2OH}_{CH_2CH_2OH}$ <br> $\mid$ <br> OH | " |
| C – 2 | " | " | $CH_3(CH_2)_{9-11}CHCH_2OCH_2CH_2N\langle{}^{CH_2CH_2OH}_{CH_2CH_2OH}$ <br> $\mid$ <br> OH | both were reacted directly |
| D | 14 + 16 | " | $CH_3(CH_2)_{11-13}CHCH_2OCH_2CH_2N\langle{}^{CH_2CH_2OH}_{CH_2CH_2OH}$ <br> $\mid$ <br> OH | reacted in solvent |
| E | 16 + 18 | " | $CH_3(CH_2)_{13-15}CHCH_2OCH_2CH_2N\langle{}^{CH_2CH_2OH}_{CH_2CH_2OH}$ <br> $\mid$ <br> OH | " |
| F | 20 – 28 | " | $CH_3(CH_2)_{17-25}CHCH_2OCH_2CH_2N\langle{}^{CH_2CH_2OH}_{CH_2CH_2OH}$ <br> $\mid$ <br> OH | " |
| G | 12 + 14 | tri-isopropanol amine | $CH_3(CH_2)_9CHCH_2OCHCH_2N\langle{}^{CH_2CH(CH_3)OH}_{CH_2CH(CH_3)OH}$ <br> $\mid\quad\mid$ <br> OH CH$_3$ (on middle C) <br> OH | " |

Synthesis Procedure 2

(Synthesis of Comparative Antistatic Agents)

In the same manner as described in Synthesis Procedure 1, various 1,2-alkylene oxides were reacted with diethanol amine and di-isopropanol amine to obtain faintly yellow reaction products.

As a result of the infrared analyses and NRM analyses, no ether linkage was observed in any of the thus-obtained reaction products, and they were apparently different from antistatic agents of this invention obtained in Synthesis Procedure 1.

The thus-obtained reaction products are shown in Table 2.

The antistatic effect for plastics of these reaction products, as comparative products, was evaluated and the results of the evaluation are shown in the examples given hereinafter.

Table 2

| Abbreviation of Antistatic Agent | Number of Carbon Atoms of 1,2-Alkylene oxide ($R_1 + 2$) | Comparative Antistatic Agents | | | Remarks |
|---|---|---|---|---|---|
| | | Kind of Alkanol Amine | Structural Formula | | |
| H | 10 | Diethanol Amine | $CH_3(CH_2)_7CHCH_2N$<br>              $|$<br>              OH | $<\!\!\begin{array}{l}CH_2CH_2OH\\ CH_2CH_2OH\end{array}$ | reacted in solvent |
| I | 12 | '' | $CH_3(CH_2)_9CHCH_2N$<br>              $|$<br>              OH | $<\!\!\begin{array}{l}CH_2CH_2OH\\ CH_2CH_2OH\end{array}$ | '' |
| J – 1 | 12 + 14 | '' | $CH_3(CH_2)_{9-11}CHCH_2N$<br>                $|$<br>               OH | $<\!\!\begin{array}{l}CH_2CH_2OH\\ CH_2CH_2OH\end{array}$ | '' |
| J – 2 | '' | '' | $CH_3(CH_2)_{9-11}CHCH_2N$<br>                $|$<br>               OH | $<\!\!\begin{array}{l}CH_2CH_2OH\\ CH_2CH_2OH\end{array}$ | both were reacted directly |
| K | 14 + 16 | '' | $CH_3(CH_2)_{11-13}CHCH_2N$<br>                 $|$<br>                OH | $<\!\!\begin{array}{l}CH_2CH_2OH\\ CH_2CH_2OH\end{array}$ | reacted in solvent |
| L | 16 + 18 | '' | $CH_3(CH_2)_{13-15}CHCH_2N$<br>                 $|$<br>                OH | $<\!\!\begin{array}{l}CH_2CH_2OH\\ CH_2CH_2OH\end{array}$ | '' |

EXAMPLE 1

1.0 Part of the antistatic agent obtained in Synthesis Procedure 1 or 2 was added to 100 parts of powdery polypropylene (manufactured by Sumitomo Kagaku K.K.), and the mixture was blended sufficiently in a mortar and kneaded for 3 minutes by means of a heating roll maintained at 170°C to form a sheet having a thickness of 1 mm.

This sheet was cut into pellets and molded into an article having a size of 5 cm × 5 cm × 2 mm (in thickness) at a mold temperature of 35°C by means of an Arburg injection molding apparatus (manufactured by Western Trading Co. Ltd.) maintained at 230°C using an injection pressure of 6 Kg/cm$^2$.

This molded article was allowed to stand still for about 24 hours in an air-conditioned room maintained at a temperature of 20°C and a relative humidity of 50%. The antistatic effect was evaluated with a static honest meter (Trade name, manufactured by Shishido Shokai). The molded article was electrically charged, then the decay of the electrification voltage was observed under certain temperature and humidity conditions. The antistatic effect was evaluated based on the period required for the electrification voltage to be reduced to one half of the initial value (half value period).

The states of coloration and luster of the sheet were observed at the time of roll kneading, and the coloration state was also observed after the roll-kneaded sheet was heated at 190°C in a heating furnace (in an air current).

The results of the measurement of the antistatic effect and the observation of the states of the coloration and luster are shown in Table 3.

Molded articles containing the antistatic agent of this invention had conspicuously improved antistatic properties as compared with a control molded article free of an antistatic agent. Their antistatic properties also were superior to those of molded articles containing the comparative antistatic agents.

No coloration was observed in either the rolled sheet or the molded article when the antistatic agent of this invention was used. Even when the rolled sheet was heated for 30 minutes under a severe temperature condition of 190°C, it was colored only slightly and no practical disadvantage was brought about.

Furthermore, the luster of the rolled sheet containing the antistatic agent was excellent as compared with that of the molded sheet free of any antistatic agent.

In the tables, the term "∞" means that no reduction of the initial electric charge was observed.

Table 3

Antistatic Effect on Polypropylene and Heat Resistance of Molded Article

| Antistatic Agent | Amount Added (Parts) | Half Value Period of Molded Article (sec) | Heat Resistance | | | Surface Condition of Rolled Sheet |
|---|---|---|---|---|---|---|
| | | | Coloration of Rolled Sheet | Coloration of Molded Article | Coloration after Heating at 190°C for 30 Minutes | |
| not added | — | ∞ | No Coloration | No Coloration | Slightly colored faint yellow | slightly shagreen-like surface |
| Products of This Invention | | | | | | |
| A | 1.0 | 28 | '' | '' | faint yellow | smooth |
| C – 1 | '' | 12 | '' | '' | '' | '' |
| C – 2 | '' | 6 | '' | '' | '' | '' |
| D | '' | 11 | '' | '' | '' | '' |
| E | '' | 17 | '' | '' | '' | '' |

Table 3—Continued

| | | | Antistatic Effect on Polypropylene and Heat Resistance of Molded Article | | | |
|---|---|---|---|---|---|---|
| Antistatic Agent | Amount Added (Parts) | Half Value Period of Molded Article (sec) | Coloration of Rolled Sheet | Heat Resistance | | Surface Condition of Rolled Sheet |
| | | | | Coloration of Molded Article | Coloration after Heating at 190°C for 30 Minutes | |
| Comparative Products | | | | | | |
| H | ″ | >200 | ″ | ″ | ″ | ″ |
| J – 1 | ″ | 20 – 80 | ″ | ″ | ″ | ″ |
| J – 2 | ″ | >200 | ″ | ″ | ″ | ″ |
| K | ″ | >200 | ″ | ″ | ″ | ″ |
| L | ″ | ∞ | ″ | ″ | ″ | ″ |

EXAMPLE 2

0.5 Part or 1.0 part of the antistatic agent obtained in Synthesis Procedure 1 or 2 was added to 100 parts of powdery polypropylene (manufactured by Sumitomo Kagaku K.K.), and the mixture was sufficiently blended in a mortar and extruded at 200° – 250°C by means of a 40 mm extruder of the Bent type to form pellets.

The thus-obtained pellets were molded into a molded article of a size of 5 cm × 10 cm × 2 mm (in thickness) by means of a 6-ounce injection molding apparatus maintained under a molding temperature of 220° – 240°C and a molding pressure of 25 Kg/cm$^2$ and at a mold temperature of 35°C.

This molded article was allowed to stand still for 1, 14 or 65 days, and the antistatic effect was measured by means of a static honest meter in an air-conditioned room. Further, according to the disclosure of Japanese Patent Publication No. 22901/69, the molded article was rubbed strongly 10 times with a dry wool fabric, then tobacco ash was positioned close to the molded article. The distance between the tobacco ash and the molded article was measured at the location at which the tobacco ash was attracted to the molded article. The results are shown in Table 4.

The molded articles containing the antistatic agent B, C-1 or E of this invention have excellent antistatic properties as compared with a control molded article free of an antistatic agent. Especially after the passage of time, they exhibit an improved antistatic effect.

As compared with molded articles containing the comparative antistatic agent I, J-1 or L, the molded articles containing the antistatic agent of this invention are superior in not only the initial antistatic effect, but also the antistatic effect after the passage of time.

In the antistatic agent of Japanese Patent Publication No. 22901/69 containing the ether linkage in the straight chain, the antistatic effect (surface resistance) to propylene is reduced with the passage of time. Thus, the antistatic agent according to the present invention is much superior to this known antistatic agent in respect to the point that the antistatic effect is improved with the passage of time.

Under the ash test conducted under the same conditions as disclosed in said Japanese Patent Publication, the antistatic agent of this invention exhibits a similar effect even when incorporated in an amount corresponding to one-fourth to one-half of the amount incorporated of the antistatic agent disclosed in said Patent Publication.

Table 4

| | | Antistatic Properties of Polypropylene Injection-Molded Article | | | | |
|---|---|---|---|---|---|---|
| Antistatic Agent | Amount Added (parts) | Half Value Period (sec) | | | Ash Test (mm) | Coloration of Molded Article |
| | | After 1 day | After 14 days | After 65 days | | |
| not added | — | ∞ | ∞ | ∞ | × | No coloration |
| Products of This Invention | | | | | | |
| B | 1.0 | 83 | 3 | 1 | 0 | ″ |
| C – 1 | 0.5 | ∞ | 7 | 1 | ∆ | ″ |
| C – 1 | 1.0 | 70 | 3 | 1 | 0 | ″ |
| E | 0.5 | ∞ | >200 | 3 | 0 | ″ |
| E | 1.0 | >200 | 4 | 2 | 0 | ″ |
| Comparative Products | | | | | | |
| I | 1.0 | ∞ | 9 | 3 | 0 | ″ |
| J – 1 | 0.5 | ∞ | ∞ | 44 | ∆ | ″ |
| J – 1 | 1.0 | ∞ | 17 | 4 | ∆ | ″ |
| L | 0.5 | ∞ | ∞ | ∞ | × | ″ |
| L | 1.0 | ∞ | >200 | 27 | ∆ | ″ |

Notes:
0 — ash was not attracted at a distance of 10 mm.
∆ — ash was attracted at a distance of 10 – 20 mm.
× — ash was attracted at a distance greater than 20 mm.

The antistatic agent of this invention exhibits a very excellent effect as is illustrated hereinabove. Further, the film was measured to show the antistatic effect. The results are shown in Table 5.

Table 5

Antistatic Effect to Biaxially Stretched Polypropylene Film

| Antistatic Agent | Amount of Antistatic Agent (parts) | Amount of Stearyl Alcohol (parts) | Half Value Period (sec) after 1 day | Half Value Period (sec) after 7 days | Distance (mm) at which Fine Powder of Silica was attracted | Transparency |
| --- | --- | --- | --- | --- | --- | --- |
| Not added | — | — | ∞ | ∞ | >100 | excellent |
| Products of This Invention | | | | | | |
| C - 1 | 1.0 | — | >200 | 29 | | excellent |
|  | 1.0 | 1.0 | 25 | | 0 | good |
| E | 1.0 | — | >200 | 77 | | excellent |
|  | 1.0 | 1.0 | 79 | | 15 | good |
| Comparative Products | | | | | | |
| J - 1 | 1.0 | — | >200 | >200 | | excellent |
|  | 1.0 | 1.0 | 143 | | 65 | good |
| K | 1.0 | 1.0 | 151 | | 40 | good | its effect is improved with the passage of time and, therefore, it is possible to reduce the amount of the antistatic agent of this invention added to the molding composition. Furthermore, it is advantageous in that even when the antistatic effect is once lost by rubbing or washing, it can readily be restored. Thus, the antistatic agent of this invention is superior to all of the controls.

EXAMPLE 3

1.0 Part of the antistatic agent obtained in Synthesis Procedure 1 or 2 and 1.0 part of stearyl alcohol were added to powdery polypropylene (manufactured by Sumitomo Kagaku Kabushiki Kaisha), and the mixture was sufficiently blended in a mortar and extruded into a sheet of a 1 mm thickness at an extrusion temperature of 220° – 250°C by means of a 40 mm extruder of the Bent type.

This sheet was stretched at a draw ratio of 7 in both the longitudinal and lateral direction to obtain a biaxially oriented film having a thickness of 20 – 25 microns. The film was subjected to corona discharge treatment, and allowed to stand still for 24 hours in an air-conditioned room. Then the antistatic effect was measured by means of a static honest meter. Further, the film was rubbed strongly 10 times with gauze and the distance at which fine powder of silica was attracted to The antistatic agents C-1 and E of this invention provide an antistatic effect also to a biaxially stretched film of polypropylene, and they are improved over the comparative products as regards the antistatic effect. Further, they do not damage the transparency of the film, and it is possible to improve the antistatic effect by employing them in combination with stearyl alcohol or the like.

EXAMPLE 4

1.0 Part of the antistatic agent obtained in Synthesis Procedure 1 or 2 was added to 100 parts of powdery high density polyethylene manufactured by Mitsui Petrochemical K.K., and the mixture was sufficiently blended in a mortar and kneaded for 3 minutes on a heating roll maintained at 135°C to form a sheet having a thickness of 1 mm. The sheet was cut into pellets and molded into a molded article having a size of 5 cm × 5 cm × 2 mm (in thickness) by means of a small Arburg injection molding apparatus maintained at an injection temperature of 180°C and a pressure of 6 Kg/cm² and at a mold temperature of 35°C. The sheet was allowed to stand still an in air-conditioned chamber maintained at a temperature of 20°C and a relative humidity of 50% for 24 hours. Then, the antistatic effect was determined by the use of a static honest meter. The results are shown in Table 6.

Table 6

Antistatic Effect on Polyethylene Molded Article

| Antistatic Agent | Amount Added (part) | Shape of Molded Article | Half Value Period (sec) | Coloration |
| --- | --- | --- | --- | --- |
| not added | — | rolled sheet | ∞ | no coloration |
|  |  | molded article | ∞ | '' |
| Product C-1 of This Invention | 1.0 | rolled sheet | 8 | '' |
|  |  | molded article | 4 | '' |
| Comparative Product J-1 | 1.0 | rolled sheet | ∞ | '' |
|  |  | molded article | 66 | |

Molded articles containing the antistatic agent of this invention exhibit conspicuously improved antistatic properties over the control article which is free of an antistatic agent. Further, coloration is not observed in either the rolled sheet or molded article, and they are excellent also in thermal stability.

EXAMPLE 5

30 Parts of dioctyl phthalate, 2.5 parts of stabilizer of the tin type and 1.0 part of the antistatic agent obtained in Synthesis Procedure 1 or 2 were added to 100 parts of polyvinyl chloride having a degree of polymerization of 1050 (Geon 103 EP) and the mixture was kneaded for 5 minutes on a heating roll maintained at 170°C to obtain a sheet having a thickness of 1 mm. This sheet was allowed to stand still for 24 hours in an air-conditioned chamber maintained at 20°C and a relative humidity of 50%. Then, the antistatic effect was determined by means of a static honest meter.

Further, this sheet was pressed at 170°C under 100 Kg/cm$^2$ for 7 minutes, and the antistatic effect was similarly examined. The results are shown in Table 7.

Table 7

Antistatic Effect on Polyvinyl Chloride

| Antistatic Agent | Amount (part) | Shape of Molded Article | Half Value Period (sec) | Coloration |
|---|---|---|---|---|
| not added | — | rolled sheet | ∞ | no coloration |
|  |  | pressed sheet | ∞ | ″ |
| Product of This Invention |  |  |  |  |
| C – 1 | 1.0 | rolled sheet | 8 | ″ |
|  |  | pressed sheet | 3 | ″ |
| E | 1.0 | rolled sheet | 32 | ″ |
|  |  | pressed sheet | 3 | ″ |
| Comparative Products |  |  |  |  |
| J – 1 | 1.0 | rolled sheet | 11 | ″ |
|  |  | pressed sheet | 5 | ″ |
| L | 1.0 | rolled sheet | 42 | ″ |
|  |  | pressed sheet | 11 | ″ |

The antistatic properties of molded articles containing the antistatic agent of this invention are conspicuously excellent as compared with those of molded articles containing the comparative antistatic agent. Further, coloration was not observed in either the rolled sheet or the pressed sheet, and a good thermal stability is obtained. Further, even when the antistatic agent of this invention is used in combination with a plasticizer and a stabilizer, the antistatic effect and thermal stability are not damaged.

EXAMPLE 6

30 Parts of diethyl phthalate and 1.0 part of the antistatic agent obtained in Synthesis Procedure 1 were added to 70 parts of cellulose diacetate, and the mixture was sufficiently blended in a mortar and kneaded for 3 minutes on a heating roll maintained at 190°C to obtain a sheet having a thickness of 1 mm. This sheet was pressed for 7 minutes at 190°C and 100 Kg/cm$^2$, and the pressed sheet was allowed to stand still in an air-conditioned chamber for 1 day or 11 days, following which the antistatic effect was determined by means of a static honest meter. The results shown in Table 8 were obtained.

Table 8

Antistatic Effect on Cellulose Acetate Resin

| Antistatic Agent | Amount (part) | Half Value Period (sec) after 1 day | Half Value Period (sec) after 11 days | Coloration of Pressed Sheet |
|---|---|---|---|---|
| not added | — | ∞ | > 200 | no coloration |
| product C-1 of this invention | 1.0 | 89 | 44 | faint yellow |
| product E of this invention | 1.0 | 169 | 98 | faint yellow |

The antistatic properties of molded articles containing the antistatic agent of this invention are conspicuously improved over those of a molded article free of an antistatic agent. The antistatic effect in the molded articles containing the antistatic agent of this invention improves with the passage of time. Further, coloration of the pressed sheet is very slight, and no practical disadvantage is brought about. Further, when the antistatic agent of this invention is used in combination with a plasticizer, it does not damage the thermal stability of the resin. Accordingly, such combined use is practical.

EXAMPLE 7

1 g of the antistatic agent obtained in Synthesis Procedure 1 was dissolved in 100 ml of isopropyl alcohol, and each of antistatic agent-free polypropylene film, polyethylene film, polyester film and nylon film was dipped in this solution for 1 minute. The films were dried in an airconditioned chamber. The antistatic agent was applied in an amount of about 0.05 mg/cm$^2$ of the film surface. The results of measurements of the antistatic effect are shown in Table 9.

Table 9

Antistatic Effect When Coated on Film Surface

| Film | Half Value Period (sec) When No Antistatic Agent Was Coated | Half Value Period (sec) When Antistatic Agent of This invention was Coated | | |
|---|---|---|---|---|
|  |  | C – 1 | F | G |
| Polypropylene | ∞ | 10 | 7 | 88 |
| Polyethylene | ∞ | 2 | 3 | 45 |
| Polyester | ∞ | 30 | 2 | 96 |
| Nylon-12 | >100 | 25 | 6 | 15 |

In each of the films coated with the antistatic agent of this invention, an excellent antistatic effect is obtained.

As mentioned above, the antistatic agent of this invention can be used with various kinds of resins, which are listed below.

Thermoplastic resin:

polyethylene, polypropylene, and other poly($\alpha$-olefins); chlorinated polyethylene, chlorinated polypropylene; polystyrene; acrylonitrile-styrene copolymer (AS), acrylonitrilebutadiene-styrene copolymer (ABS), poly(methyl methacrylate) polyacrylonitrile, poly(vinylacetate), poly(vinyl acetals); poly(vinylchloride), poly(vinylidenechloride), poly(vinylethers), poly(vinylketones); 6, 66, 610, 11, 12 nylon; poly(ethyleneterephthalate), polyurethane, polyoxymethylene, polycarbonates; cellulose acetate, cellulose butyrate.

Thermosetting resin:

phenolic resins, melamine-formaldehyde resins, urea formaldehyde resins, unsaturated polyester resins, epoxy resins, urethane resins, alkyd resins, furan resins.

Elastomer:

natural rubber, styrene butadiene rubber (SBR), nitrile rubber, cis 1,4-polybutadiene, trans 1,4-polybutadiene, polyisobutylene, polychloroprene.

The embodiments of the invention in which an exclusive property or privilege is claimed are defined as follows:

1. An antistatic agent of the formula

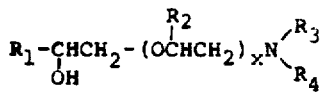

wherein
   $R_1$ is alkyl having from 7 to 29 carbon atoms,
   $R_2$ is H or alkyl having 1 or 2 carbon atoms,
   $R_3$ is lower alkyl having from 1 to 4 carbon atoms or hydroxyalkyl of the formula

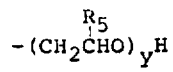

in which $R_5$ is H or alkyl having 1 or 2 carbon atoms and $y$ is an integer of from 1 to 3,
   $R_4$ is lower alkyl having from 1 to 4 carbon atoms or hydroxyalkyl of the formula

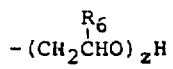

in which $R_6$ is H or alkyl having 1 or 2 carbon atoms and $z$ is an integer of from 1 to 3, and
   $x$ is an integer of from 1 to 3.

2. An antistatic agent according to claim 1, in which $R_1$ is selected from the group consisting of n-octyl, n-decyl, n-dodecyl, n-tetradecyl, n-hexadecyl, n-octadecyl and mixtures thereof.

3. An antistatic agent according to claim 1, in which $x$ is one, $R_2$ is H, and $R_3$ and $R_4$ each is $CH_2CH_2OH$.

4. An antistatic agent according to claim 1, in which $x$ is one, $R_2$ is $CH_3$ and $R_3$ and $R_4$ each is $CH_2CH(CH_3)OH$.

* * * * *